United States Patent
Wu

(10) Patent No.: US 9,570,944 B2
(45) Date of Patent: Feb. 14, 2017

(54) POWER CONSUMPTION MEASUREMENT AND CONTROL APPARATUS, METHOD, AND NON-TRANSITORY COMPUTER READABLE STORAGE MEDIUM THEREOF

(71) Applicant: Institute For Information Industry, Taipei (TW)

(72) Inventor: Jui-Ming Wu, New Taipei (TW)

(73) Assignee: Institute For Information Industry, Taipei (TW)

( * ) Notice: Subject to any disclaimer, the term of this patent is extended or adjusted under 35 U.S.C. 154(b) by 481 days.

(21) Appl. No.: 14/104,867

(22) Filed: Dec. 12, 2013

(65) Prior Publication Data

US 2015/0148978 A1    May 28, 2015

(30) Foreign Application Priority Data

Nov. 25, 2013   (TW) .............................. 102142896 A

(51) Int. Cl.
*G05D 3/12*        (2006.01)
*H02J 13/00*       (2006.01)
*G01D 4/00*        (2006.01)

(52) U.S. Cl.
CPC ............. *H02J 13/0086* (2013.01); *G01D 4/00* (2013.01); *Y02B 90/244* (2013.01); *Y04S 20/327* (2013.01)

(58) Field of Classification Search
CPC .... G06Q 20/40; G06Q 40/12; G06Q 20/1235; G06Q 20/3278; G06Q 20/3829; H04L 67/025; H04L 12/2818; H04L 12/282; H04L 67/306; H04L 12/2816; Y02T 90/128; Y04S 20/222; Y04S 20/14; Y04S 20/225

See application file for complete search history.

(56) References Cited

U.S. PATENT DOCUMENTS

| | | | | |
|---|---|---|---|---|
| 2009/0058995 | A1* | 3/2009 | Yamashita ............. | G07C 5/085 348/61 |
| 2009/0192927 | A1* | 7/2009 | Berg ...................... | G06Q 30/04 705/34 |
| 2009/0322160 | A1* | 12/2009 | DuBose .................. | H02J 9/005 307/131 |
| 2012/0169123 | A1* | 7/2012 | Kim ........................ | H02J 9/005 307/60 |
| 2012/0265357 | A1* | 10/2012 | Song ...................... | G01D 4/002 700/291 |

(Continued)

*Primary Examiner* — Darrin Dunn
(74) *Attorney, Agent, or Firm* — Skaar Ulbrich Macari, P.A.

(57) ABSTRACT

A power consumption measurement and control apparatus, method, and non-transitory computer readable storage medium thereof are provided. The power consumption measurement and control apparatus includes a power input line, a power output line, a sensing interface, a processing unit, a button, and a power consumption measurement and control unit. The power consumption measurement and control unit has a logic switch. When the logic switch is off and the processing unit receives an identification signal from the sensing interface, the logic switch is turned on. When the logic switch is on and one of the following conditions happens, the logic switch is turned off: (a) another identification signal from the sensing interface is received, and (b) the power consumption amount flowing out the power output line is below a predetermined threshold over a predetermined time interval.

21 Claims, 10 Drawing Sheets

(56) References Cited

U.S. PATENT DOCUMENTS

2013/0073060 A1* 3/2013 Dawley ................ H02J 13/001
 700/20
2013/0093242 A1* 4/2013 Mok ....................... H02J 9/005
 307/23

* cited by examiner

POWER CONSUMPTION MEASUREMENT AND CONTROL APPARATUS, METHOD, AND NON-TRANSITORY COMPUTER READABLE STORAGE MEDIUM THEREOF

PRIORITY

This application claims priority to Taiwan Patent Application No. 102142896 filed on Nov. 25, 2013, which is hereby incorporated by reference herein in its entirety.

FIELD

The present invention relates to a power consumption measurement and control apparatus, method, and non-transitory computer readable storage medium thereof. More particularly, the present invention relates to a power consumption measurement and control apparatus, method, and non-transitory computer readable storage medium thereof which can be shared by a number of people and is capable of calculating and apportioning the power consumption amount among individual users.

BACKGROUND

As the shortage of resources becomes increasingly severe and the energy prices increase continuously, energy management has become a great concern of the public. A commonly-used power energy management method works in the following way: the power consumption conditions of users are measured, recorded, and analyzed and then the analysis result is provided to users for reference so as to help users change their power consumption behaviors and save power consumption. Generally, a clearer responsibility division of power consumption will lead to a higher energy-saving motivation and a better energy-saving effect.

In conventional technologies, some power consumption management mechanisms can only measure and record the total power consumption of individual electric apparatuses but can not measure and record the power consumption of an individual user. Meantime, some other power consumption management mechanisms can only measure and record the power consumption of a single user at a time but can not support sharing/apportioning of power consumption. For example, if four students live in a same dormitory, then the conventional technologies can not calculate the individual power consumption of each student living in this dormitory because every one has his/her own work-and-rest schedule and the time he/she spends in the dormitory is different from that of others. Since the conventional technologies can not manage the power consumption of each individual user, the energy-saving motivation and effect are relatively poor.

Accordingly, there is an urgent need in providing a power consumption measurement and control mechanism which can be shared by several users and is capable of calculating and apportioning the power consumption among individual users.

SUMMARY

To solve the problems with the prior art, certain embodiments of the present invention provide a power consumption measurement and control apparatus, method, and non-transitory computer readable storage medium thereof.

The power consumption measurement and control apparatus provided in certain embodiments of the present invention comprises a power input line, a power output line, a sensing interface, a processing unit, and a power consumption measurement and control unit. The processing unit is electrically connected to the sensing interface and the power consumption measurement and control unit. The power consumption measurement and control unit includes a logic switch, wherein the logic switch is connected to the power input line and the power output line. The power consumption measurement and control unit measures a power consumption amount flowing out the power output line. When the logic switch is off and the processing unit receives a first identification signal from the sensing interface, the processing unit transmits a first control signal to the power consumption measurement and control unit and the logic switch is turned on in response to the first control signal. The first identification signal is a data message read from a smart tag by the sensing interface. When the logic switch is on and one of the following conditions happens: (a) the processing unit receives a second identification signal from the sensing interface, wherein the second identification signal is a data message read from the smart tag by the sensing interface and (b) the processing unit determines that the power consumption amount is below a predetermined threshold over a predetermined time interval, the processing unit transmits a second control signal to the power consumption measurement and control unit and the logic switch is turned off in response to the second control signal.

The power consumption measurement and control method provided in certain embodiments of the present invention is adapted for a power consumption measurement and control apparatus. The power consumption measurement and control apparatus comprises a processing unit, a power input line, a power output line, a sensing interface, and a power consumption measurement and control unit. The processing unit is electrically connected to the sensing interface and the power consumption measurement and control unit. The power consumption measurement and control unit comprises a logic switch, wherein the logic switch is connected to the power input line and the power output line. The power consumption measurement and control unit further measures a power consumption amount flowing out the power output line. The power consumption measurement and control method comprises the following steps of: (a) transmitting a first control signal to the power consumption measurement and control unit by the processing unit so that the logic switch is turned on in response to the first control signal when the logic switch is off and the processing unit receives a first identification signal from the sensing interface, wherein the first identification signal is a data message read from a smart tag by the sensing interface, and (b) transmitting a second control signal to the power consumption measurement and control unit by the processing unit so that the logic switch is turned off in response to the second control signal when the logic switch is on and one of the following conditions happens: (b1) the processing unit receives a second identification signal from the sensing interface, wherein the second identification signal is a data message read from the smart tag by the sensing interface and (b2) the processing unit determines that the power consumption amount is below a predetermined threshold over a predetermined time interval.

The non-transitory computer readable storage medium provided in certain embodiments of the present invention has a computer program stored therein. When the computer program is loaded into a power consumption measurement and control apparatus, the computer program executes a power consumption measurement and control method. The power consumption measurement and control apparatus comprises a processing unit, a power input line, a power output line, a sensing interface, and a power consumption measurement and control unit. The processing unit is electrically connected to the sensing interface and the power consumption measurement and control unit. The power consumption measurement and control unit comprises a logic switch connected to the power input line and the power output line. The power consumption measurement and control unit is further configured to measure a power consumption amount flowing out the power output line. The power consumption measurement and control method comprises the following steps of: (a) transmitting a first control signal to the power consumption measurement and control unit by the processing unit so that the logic switch is turned on in response to the first control signal, when the logic switch is off and the processing unit receives a first identification signal from the sensing interface, wherein the first identification signal is a data message read from a smart tag by the sensing interface, and (b) transmitting a second control signal to the power consumption measurement and control unit by the processing unit so that the logic switch is turned off in response to the second control signal when the logic switch is on and one of the following conditions happens: (b1) the processing unit receives a second identification signal from the sensing interface, wherein the second identification signal is a data message read from the smart tag by the sensing interface and (b2) the processing unit determines that the power consumption is below a predetermined threshold over a predetermined time interval.

The present invention in certain embodiment provides a special power consumption measurement and control apparatus, method, and non-transitory computer readable storage medium thereof. When the logic switch of the power consumption measurement and control apparatus is off, an identification signal is sensed by the sensing interface from a smart tag, and the identification signal is received by the processing unit from the sensing interface, the processing unit transmits a control signal to the power consumption measurement and control unit so that the logic switch is turned on accordingly. In addition, the power consumption measurement and control apparatus of the present invention can have its logic switch turned off in the following three ways of: (i) the processing unit receives a triggering signal from a button (if the power consumption measurement and control apparatus comprises the button), (ii) the sensing interface sensing another identification signal from the smart tag and the processing unit receives the another identification signal from the sensing interface, and (iii) the processing unit determines that a power consumption amount flowing out the power output line is below a predetermined threshold over a predetermined time interval. Consequently, the user can turn on and turn off the power consumption measurement and control apparatus in various ways.

Moreover, the present invention in certain embodiments is able to define a plurality of time points, define a time interval by every two consecutive time points, calculate the interval power consumption amount of the power consumption measurement and control apparatus within each time interval, and calculate the interval individual power consumption amount of each user within this time interval. In the present invention, the time points may be defined by the power consumption measurement and control apparatus in response to different behaviors (e.g., (i) the sensing interface included in the power consumption measurement and control apparatus senses an identification signal, (ii) when the user turns off the electric appliance directly, which causes a power consumption amount flowing out the power output line below a predetermined threshold over a predetermined time interval, and/or (iii) the user presses the button so that a triggering signal is generated by the button).

Furthermore, the power consumption measurement and control apparatus, method, and non-transitory computer readable storage medium thereof provided in certain embodiments of the present invention also determine whether the identification code carried by the sensed identification signal corresponds to a login behavior or a logout behavior and record the total power consumption amount corresponding to the identification code timely (e.g., write the total power consumption amount corresponding to the identification code into the smart tag). With the power consumption measurement and control technology provided in the present invention, the power consumption amount apportioned to each user (or the electric charge apportioned to each user) can be calculated reasonably when several users share the use of an electric appliance together.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the power consumption measurement and control apparatus, method, and non-transitory computer readable storage medium thereof provided by certain embodiments of the present invention will be explained with reference to example embodiments thereof. However, these example embodiments of the present invention are not intended to limit the present invention to any specific examples, embodiments, environment, applications or implementations described in these example embodiments. Therefore, description of these example embodiments is only for purpose of illustration rather than to limit the present invention. It shall be appreciated that elements unrelated to the present invention are omitted from depiction in the following embodiments and the attached drawings.

Figure 1:
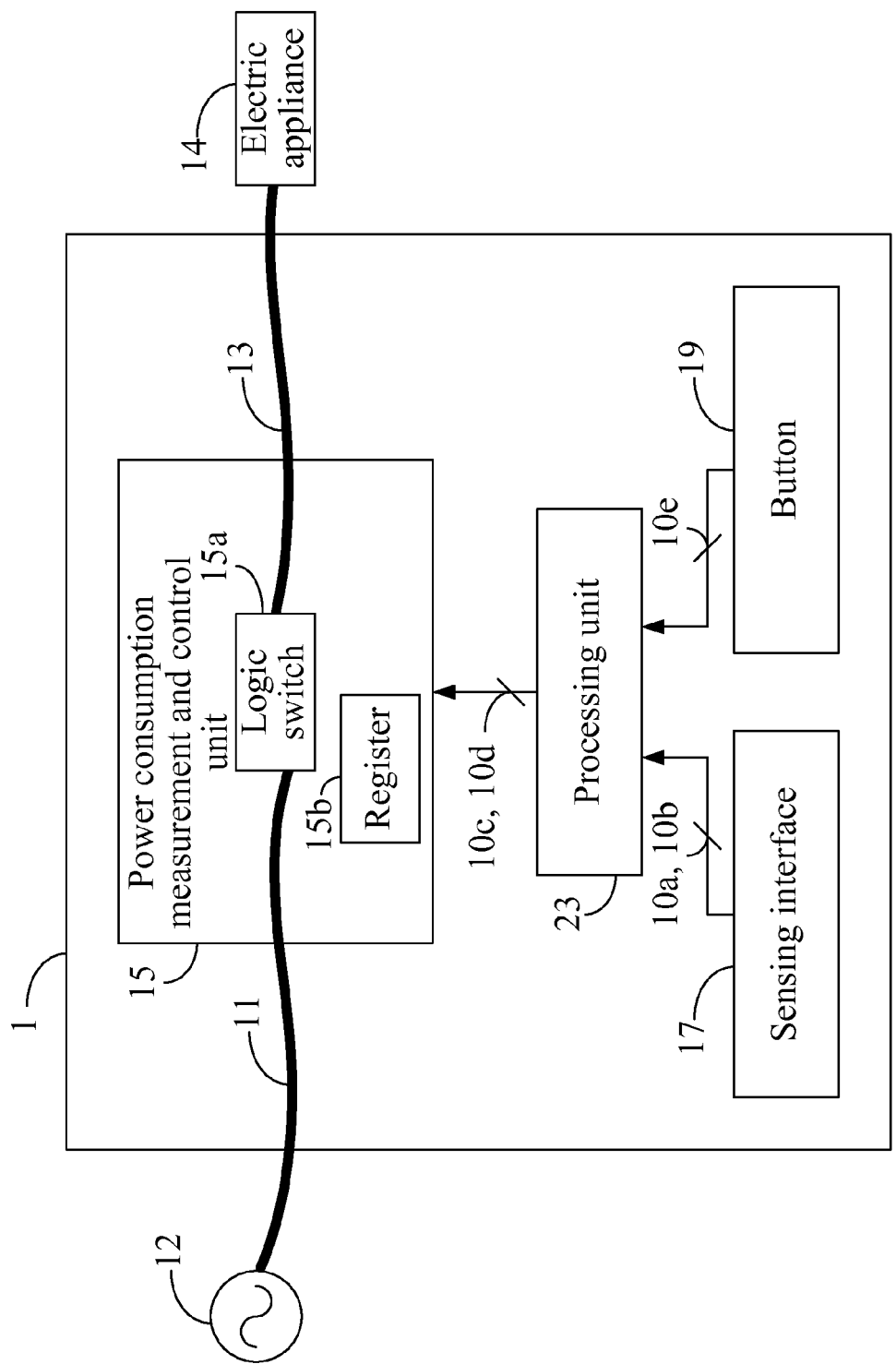
FIG. 1 is a schematic view of a first embodiment and a second embodiment of the present invention.

A first embodiment of the present invention is a power consumption measurement and control apparatus 1, a schematic view of which is depicted in FIG. 1. The power consumption measurement and control apparatus 1 comprises a power input line 11, a power output line 13, a power consumption measurement and control unit 15, a processing unit 23, a sensing interface 17, and a button 19. The power input line 11 is adapted to be connected to a power source 12, while the power output line 13 is adapted to be connected to at least one electric appliance 14. The electric appliance 14 may or may not have its own switch. The power consumption measurement and control unit 15 comprises a logic switch 15a and a register 15b, wherein the logic switch 15a is connected to the power input line 11 and the power output line 13. The processing unit 23 is electrically connected to the button 19, the sensing interface 17, and the power consumption measurement and control unit 15.

In this embodiment, the power consumption measurement and control unit 15 may be an apparatus/element having the function of measuring power consumption and controlling the power supply that is well known to those of ordinary skill in the art. The processing unit 23 may be any of various processors, central processing units (CPUs), microprocessors, or other computing devices well known to those of ordinary skill in the art. In this embodiment, the sensing interface 17 is a near field communication (NFC) reader-writer, so the smart tag used for the user is an NFC smart tag. It should be noted that in other embodiments of the present invention, the sensing interface may also be any kind of contact smart-card sensors or contactless smart-card sensors, or it may be any kind of sensors which can sense biometric features (e.g., fingerprints, palm shapes, voices, etc.).

In this embodiment, the power consumption measurement and control unit 15 has the following functions: (i) receiving a control signal from the processing unit 23 so as to turn on or turn off the logic switch 15a, (ii) measuring the power consumption amount flowing out the power output line 13 in real time and then storing the measured power consumption amount into a register (not shown) so that the power consumption amount can be read and calculated by the processing unit 23, wherein the power consumption amount may be kilowatt hour (kWh) values, electric power (Watt) values, current values, voltage values, or other related data, and (iii) controlling the power consumption amount flowing out the power output line 13 not to exceed a basic power value when the logic switch 15a is off. The basic power value is a power value that allows the electric appliance 14 to perform a hot standby operation and/or a cooling operation, wherein the basic power value may be stored in a register (not shown) included in the power consumption measurement and control unit 15. If the hot standby operation and the cooling operation are unnecessary for the electric appliance 14, the basic power value may be zero.

With the functions of the power consumption measurement and control unit 15, if the processing unit 23 receives an identification signal 10a from the sensing interface 17 under the condition that the logic switch 15a is off, the processing unit 23 will transmit a control signal 10c to the power consumption measurement and control unit 15. After the identification signal 10a is received by the power consumption measurement and control unit 15, the logic switch 15a will be turned on in response to the control signal 10a. It shall be appreciated that the aforesaid identification signal 10a is a data message read from a smart tag by the sensing interface 17 when a user touches the sensing interface 17 with the smart tag. After the logic switch 15a is turned on (i.e., when the logic switch 15a is on), the power input line 11 and the power output line 13 will be connected to each other, and then the power consumption measurement and control unit 15 can measure the power consumption amount flowing out the power output line 13.

In case that the electric appliance 14 has its own logic switch, when the logic switch 15a is on and the switch of the electric appliance 14 is off, the electric appliance 19 will not operate until the user turns on the switch of the electric appliance 19. If the electric appliance 14 does not have its own logic switch, the electric appliance 19 will operate once the logic switch 15a is turned on.

Furthermore, when the logic switch 15a is on and one of the following conditions (a)-(c) happens, the processing unit 23 transmits a control signal 10d to the power consumption measurement and control unit 15 so that the logic switch 15a is turned off in response to the control signal 10d. The condition (a) is that the processing unit 23 receives a triggering signal 10e from the button 19 (e.g., when the user presses the button 19), the condition (b) is that the processing unit 23 receives another identification signal 10b from the sensing interface 17 and the content of the identification signal 10b is the same as that of the identification signal 10a, and the condition (c) is that the processing unit 23 determines that the power consumption amount flowing out the power output line 13, which is measured by the power consumption measurement and control unit 15, is below a predetermined threshold over the predetermined time interval.

It shall be appreciated that in other embodiments of the present invention, the power consumption measurement and control apparatus 1 may further comprise an indicator light that indicates the state of the logic switch 15a (e.g., the green color represents that the logic switch 15a is on, while the red color represents that the logic switch 15a is off). Additionally, in other embodiments of the present invention, the power consumption measurement and control apparatus may not be provided with a button, in which case the power consumption measurement and control apparatus will perform all the operations except operations related to the button.

Moreover, in other embodiments, the sensing interface 17 may communicate with a mobile apparatus in an NFC peer to peer mode. In those embodiments, the administrator can set the basic power value of the power consumption measurement and control unit 15 through a mobile apparatus. Furthermore, in some embodiments, if the sensing interface is not an NFC reader, the power consumption measurement and control apparatus 1 may also communicate with a serving apparatus through a wireless sensing network interface, a power line communication (PLC) interface, or any kind of interfaces which can be used for communication. In those embodiments, the administrator can set the basic power value of the power consumption measurement and control unit 15 through the serving apparatus. Moreover, in other embodiments, if the power consumption measurement and control apparatus does not have to provide services related to the basic power value, the power consumption measurement and control unit 15 may not be provided with the register 15b.

As can be known from the above descriptions, when the logic switch 15a of the power consumption measurement and control apparatus 1 is off and the processing unit 23 receives an identification signal from the sensing interface 17, the logic switch 15a will be turned on in response to the identification signal. On the other hand, when the logic switch 15a of the power consumption measurement and control apparatus 1 is on, the logic switch 15a can be turned off by any one of the three ways. Therefore, the user can turn on and turn off the power consumption measurement and control apparatus 1 in various ways.

A second embodiment of the present invention is also a power consumption measurement and control apparatus 1. In this embodiment, the power consumption measurement and control apparatus 1 can further measure and record the power consumption amount of different time intervals in addition to all the operations described in the first embodiment.

Specifically, after the logic switch 15a is turned on in response to the control signal 10c that transmitted by the processing unit 23 to the power consumption measurement and control unit 15, the logic switch 15a will be turned off if any one of the following conditions happens: (a) the processing unit 23 receives a triggering signal 10e from the button 19, (b) an identification signal 10b with the same content as the identification signal 10a is sensed by the sensing interface 17, and (c) the processing unit 23 determines that the power consumption amount flowing out the power output line 13, which is measured by the power consumption measurement and control unit 15, is below a predetermined threshold over a predetermined time interval. The actions of turning on and turning off the logic switch 15a define a time interval and the logic switch 15a is on during the time interval. In this embodiment, the power consumption measurement and control apparatus 1 measures and records an interval power consumption amount flowing out the power output line 13 within this time interval. For example, the power consumption measurement and control unit 15 may firstly record a first power consumption when the logic switch 15a is turned on and then record a second power consumption when the logic switch 15a is turned off. The first power consumption and second power consumption may be recorded in another register (not shown) comprised in the power consumption measurement and control unit 15. Afterwards, the processing unit 23 reads the first power consumption and the second power consumption and subtracts the first power consumption from the second power consumption to obtain the interval power consumption amount.

Figure 2:
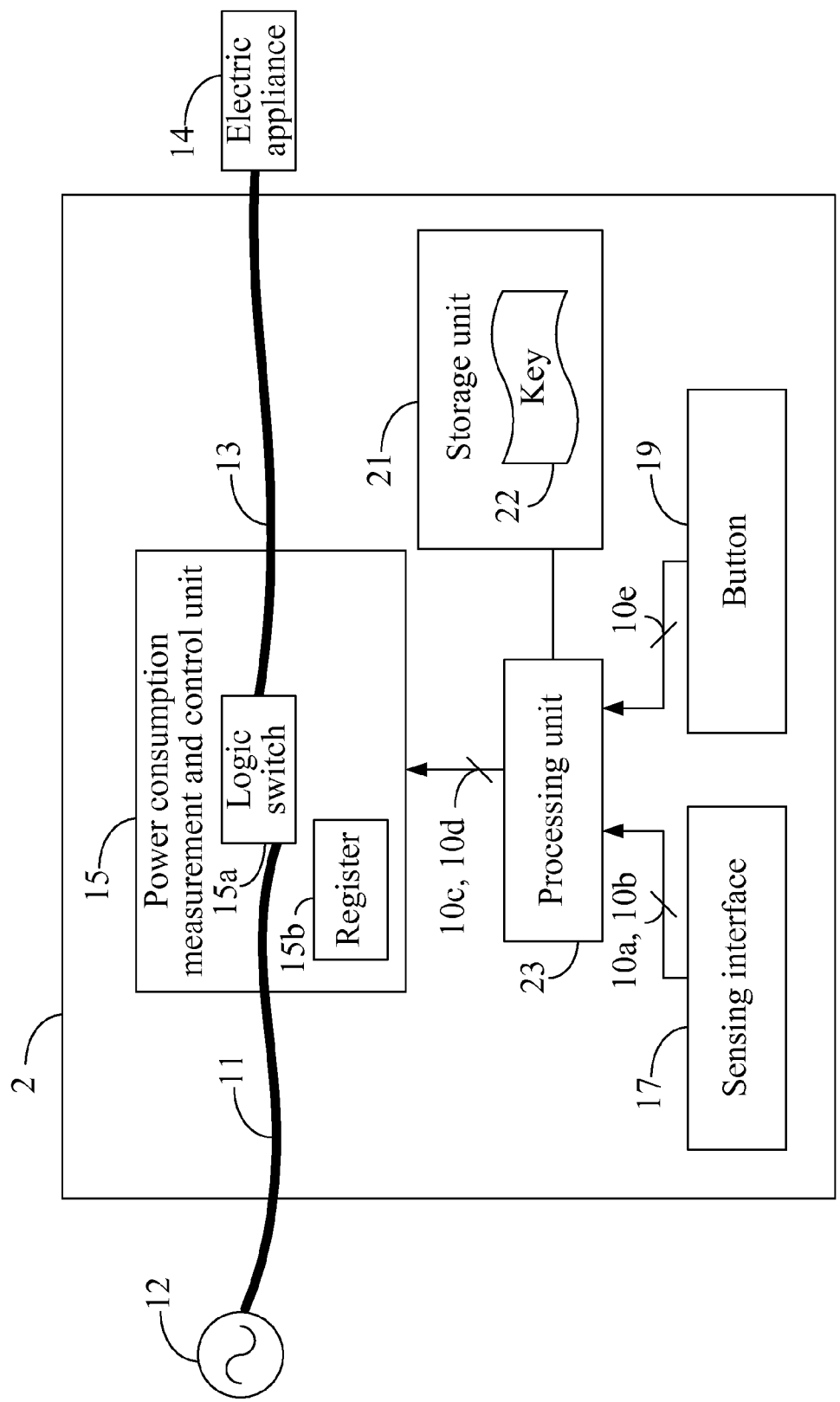
FIG. 2 is a schematic view of a third embodiment of the present invention.

A third embodiment of the present invention is a power consumption measurement and control apparatus 2, a schematic view of which is depicted in FIG. 2. The power consumption measurement and control apparatus 2 comprises a power input line 11, a power output line 13, a power consumption measurement and control unit 15, a sensing interface 17, a button 19, a processing unit 23, and a storage unit 21. The storage unit 21 is stored with a key 22. The power input line 11, the power output line 13, the power consumption measurement and control unit 15, the sensing interface 17, the button 19, and the processing unit 23 comprised in the power consumption measurement and control apparatus 2 can execute all the operations described in the first embodiment and second embodiment, so they will not be further described herein.

In this embodiment, the storage unit 21 may be a memory, a floppy disk, a hard disk, a compact disk (CD), a mobile disk, a database, or any other storage media or circuitry with the same function and well known to those of ordinary skill in the art.

In this embodiment, when the processing unit 23 receives the identification signal 10a from the sensing interface 17, the processing unit 23 further performs a verification procedure on a verification data (not shown) carried by the identification signal 10a by using the key 22. Only when the verification data carried by the identification signal 10a passes the verification procedure will the processing unit 23 transmit the control signal 10c to the power consumption measurement and control unit 15 to make the logic switch 15a turned on accordingly. The present invention may perform various kinds of verification procedures by using the key 22. For example, the source of the identification signal 10a (e.g., a mobile apparatus or a smart tag) may compress the data by using another key identical to the key 22 and take the compressed result as the verification data carried by the identification signal 10a. Afterwards, the processing unit 23 verifies the verification data carried by the identification signal 10a by using the key 22 stored in the storage unit 21. As another example, the verification data carried by the identification signal 10a may be a key; in this example, the verification procedure performed by the processing unit 23 is to determine whether the verification data carried by the identification signal 10a is the same as the key 22 stored in the storage unit 21. If they are the same, it means that the verification data passes the verification procedure.

Similarly, after the processing unit 23 receives the identification signal 10b from the sensing interface 17, the processing unit 23 performs a verification procedure on verification data (not shown) carried by the identification signal 10b by using the key 22. Only when the verification data carried by the identification signal 10b passes the verification procedure will the processing unit 23 transmit the control signal 10d to the power consumption measurement and control unit 15 to make the logic switch 15a turned off accordingly.

As can be known from the above descriptions, the power consumption measurement and control apparatus 2 performs a verification procedure by using the key 22, so the access can be controlled and managed.

Figure 3:
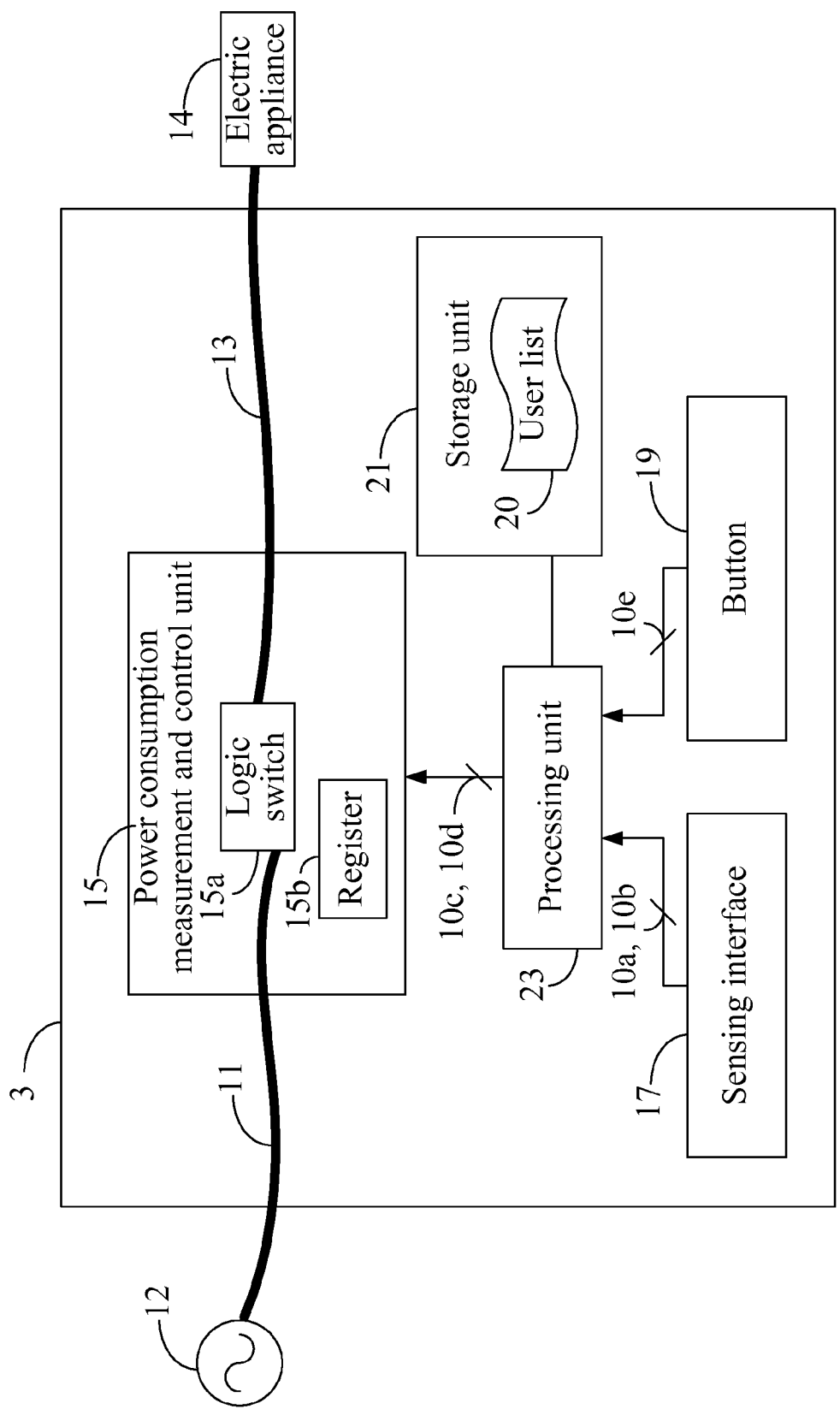
FIG. 3 is a schematic view of a fourth embodiment of the present invention.

A fourth embodiment of the present invention is a power consumption measurement and control apparatus 3, a schematic view of which is depicted in FIG. 3. The power consumption measurement and control apparatus 3 comprises a power input line 11, a power output line 13, a power consumption measurement and control unit 15, a sensing interface 17, a button 19, a processing unit 23, and a storage unit 21, wherein the storage unit 21 is stored with a user list 20, wherein the user list 20 records a user number (not shown) and a user identification list (not shown) of a current time interval. The power input line 11, the power output line 13, the power consumption measurement and control unit 15, the sensing interface 17, the button 19, the processing unit 23, and the storage unit 21 comprised in the power consumption measurement and control apparatus 3 can execute all the operations described in the aforesaid first embodiment and second embodiment, so they will not be further described herein.

The fourth embodiment differs from the aforesaid embodiments in that the power consumption measurement and control apparatus 3 of the fourth embodiment can be used by several users together. Specifically, if the processing unit 23 receives the identification signal 10a from the sensing interface 17 when the logic switch 15a is off, the processing unit 23 transmits a control signal 10c to the power consumption measurement and control unit 15 so that the logic switch 15a is turned on correspondingly. In addition, the processing unit 23 also adds an identification code carried by the identification signal 10a into the user identification list of the user list 20 and increase the user number by one.

In this embodiment, if one of the following conditions (a)-(c) happens when the logic switch 15a is on, the way in which this embodiment operates subsequently will be slightly different from that of the first embodiment. The aforementioned condition (a) is that the processing unit 23 receives the triggering signal 10e from the button 19, the aforementioned condition (b) is that the processing unit 23 receives the identification signal 10b from the sensing interface 17, and the aforementioned condition (c) is that the processing unit 23 determines that the power consumption amount flowing out the power output line 13, which is measured by the power consumption measurement and control unit 15, is below the predetermined threshold over the predetermined time interval.

Firstly, the details of the condition (a) (i.e. the processing unit 23 receives the triggering signal 10e from the button 19) and the condition (c) (i.e. the processing unit 23 determines that the power consumption amount flowing out the power output line 13, which is measured by the power consumption measurement and control unit 15, is below the predetermined threshold over the predetermined time interval) is described. When the aforesaid condition (a) and condition (c) happen, the processing unit 23 will also delete the content of the user identification list and set the user number to zero in addition to turning off the logic switch 15b.

If the logic switch 15a is on and the processing unit 23 receives the identification signal 10b from the sensing interface 17 (i.e., the aforesaid condition (b)), the processing unit 23 will perform additional confirmation. Only when the processing unit 23 determines that an identification code carried by the identification signal 10b has been stored into the user identification list and the user number is one will the processing unit 23 transmit the control signal 10d to the power consumption measurement and control unit 15 to make the logic switch 15a turned off accordingly and will the processing unit 23 delete the content of the user identification list and set the user number to zero. If the processing unit 23 determines that an identification code carried by the identification signal 10b has been stored into the user identification list but the user number is greater than one, the processing unit 23 will not transmit the control signal 10d to the power consumption measurement and control unit 15 (i.e., the logic switch 15a will not be turned off) but the processing unit 23 will still delete the identification code from the user identification list and decrease the user number by one. Furthermore, if the processing unit 23 determines that the identification code carried by the identification signal 10b is not stored into the user identification list, the processing unit 23 will not transmit the control signal 10d to the power consumption measurement and control unit 15 (i.e., the logic switch 15a will not be turned off) and will add the identification code into the user identification list and increase the user number by one.

It shall be appreciated that all the operations set forth in the third embodiment can be further executed when the storage unit 21 of the power consumption measurement and control apparatus 3 also has a key stored therein. Hence, the details will not be further described herein.

As can be known from the above descriptions, the power consumption measurement and control apparatus 3 of this embodiment can be used by several users at the same time through timely inquiring and updating the user number and the user identification list recorded in the user list 20.

Figure 4A:
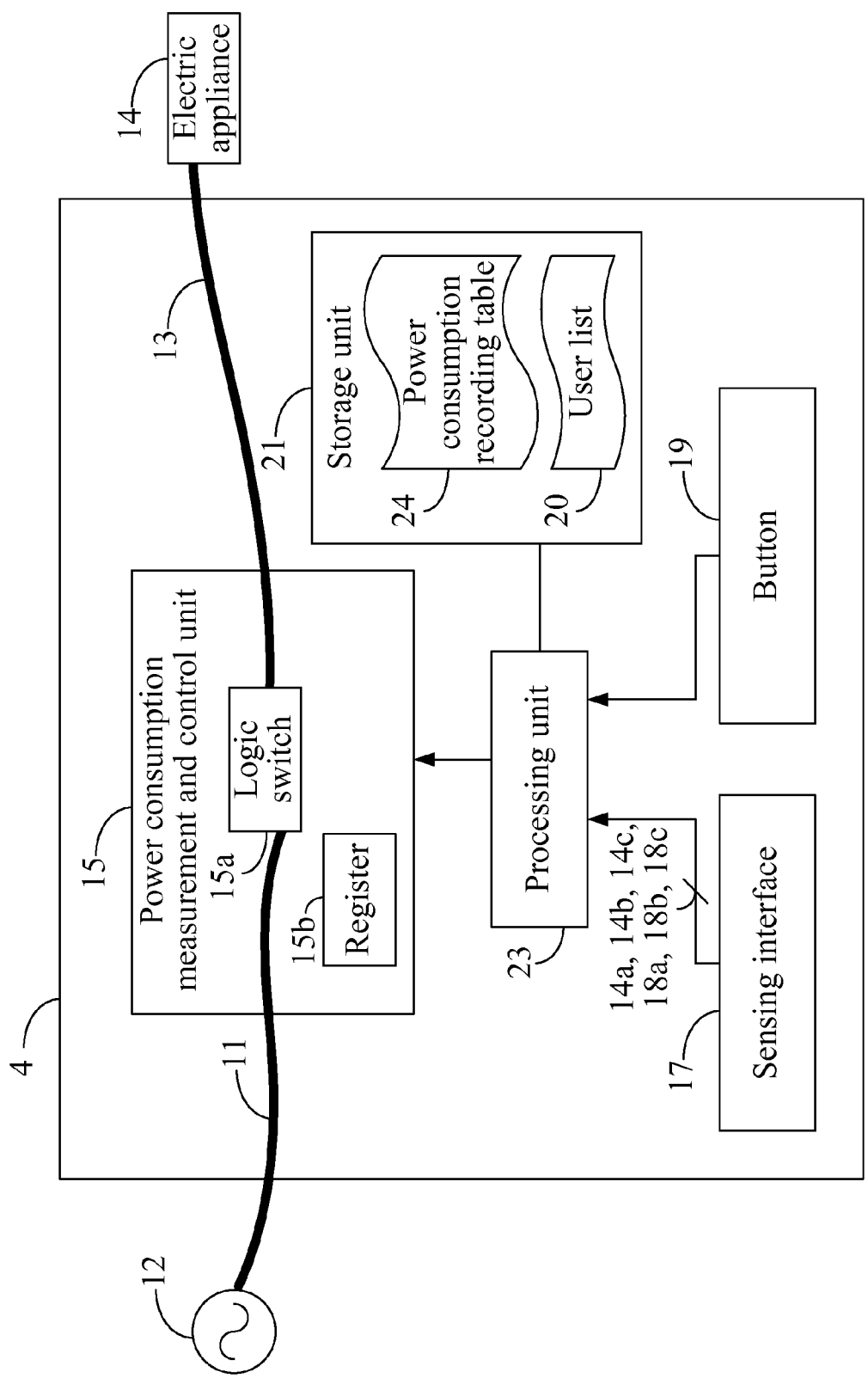
FIG. 4A is a schematic view of a fifth embodiment and a sixth embodiment of the present invention.
Figure 4B:
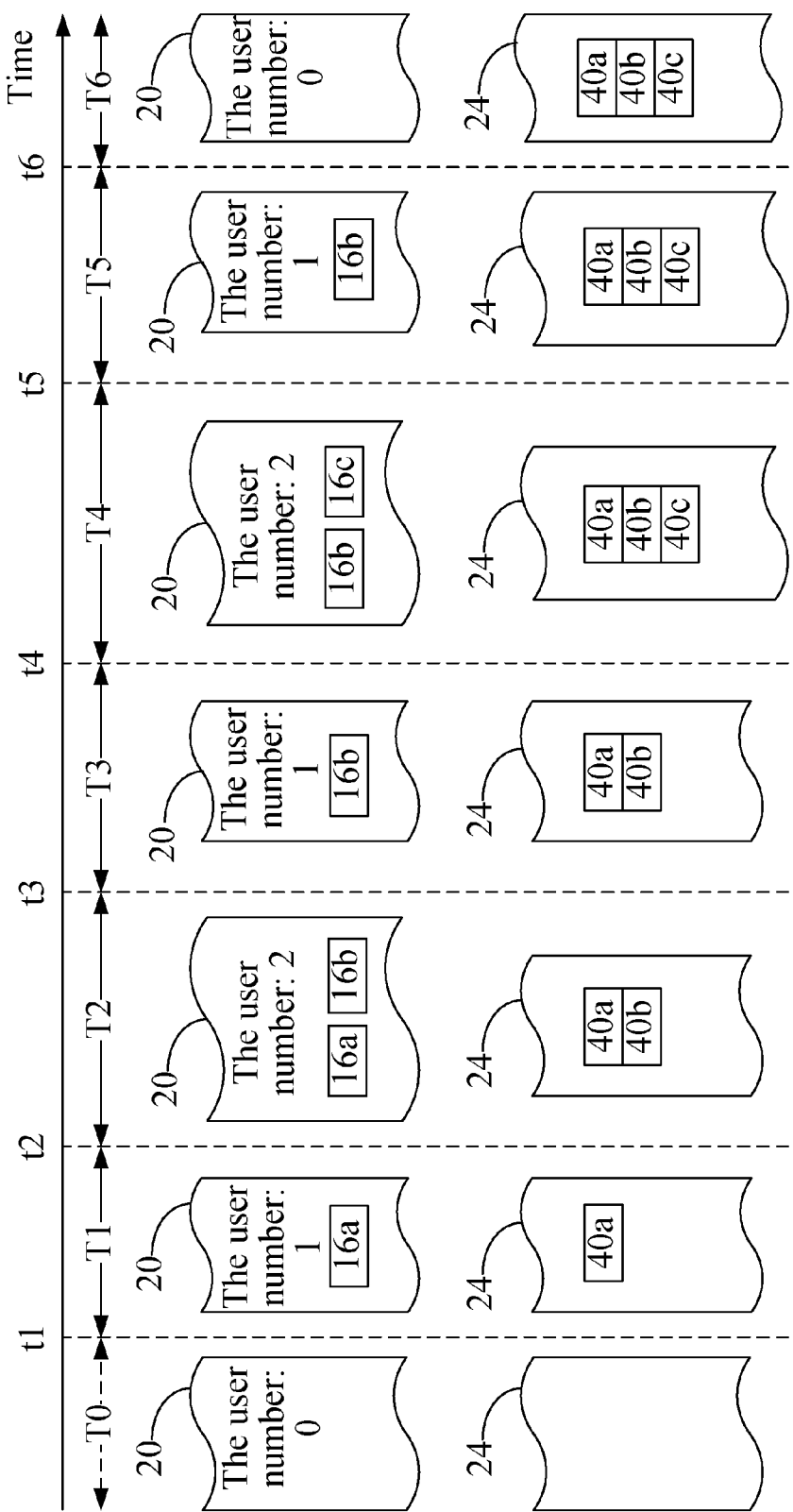
FIG. 4B depicts a user list and a power consumption recording table of the fifth embodiment.

A fifth embodiment of the present invention is a power consumption measurement and control apparatus 4, a schematic view of which is depicted in FIG. 4A and FIG. 4B. The power consumption measurement and control apparatus 4 comprises a power input line 11, a power output line 13, a power consumption measurement and control unit 15, a sensing interface 17, a button 19, a processing unit 23, and a storage unit 21. The power input line 11, the power output line 13, the power consumption measurement and control unit 15, the sensing interface 17, the button 19, the processing unit 23, and the storage unit 21 included in the power consumption measurement and control apparatus 4 can execute all the operations executed by the aforesaid embodiments, so they will not be further described herein. In this embodiment, the storage unit 21 is stored with a user list 20 and a power consumption recording table 24, wherein the user list 20 records a user number and a user identification list of a current time interval.

Please refer to FIG. 4B together. FIG. 4B depicts the content of the user lists 20 and the power consumption recording tables 24 of different time intervals in this embodiment.

In this embodiment, the electric appliance 14 does not have its own switch, so turn-on or turn-off of the electric appliance 14 is achieved through the logic switch 15a. Initially, the logic switch 15a is off and no information is recorded in the user list 20 and the power consumption recording table 24. If a user wants to share the use of the electric appliance 14, he/she needs to place his/her smart tag within the signal coverage of the sensing interface 17 (e.g., move the smart tag close to the sensing interface 17) so that the sensing interface 17 can read the data message from the smart tag.

It is assumed that a first user wants to share the use of the electric appliance 14 and places his/her first smart tag within the signal coverage of the sensing interface 17. The sensing interface 17 senses an identification signal 14a from the first smart tag and transmits it to the processing unit 23. After the processing unit 23 receives the identification signal 14a, the processing unit 23 defines a time point t1 accordingly. The identification signal 14a carries an identification code 16a of the first smart tag. The processing unit 23 determines that the identification code 16a is not recorded in the user identification list of the user list 20, so it adds the identification code 16a into the user identification list of the user list 20 and increases the user number by one. Since the logic switch 15a is off initially, the logic switch 15a will be turned on after the identification signal 14a is sensed by the sensing interface 17.

On the other hand, the sensing interface 17 writes a personal power consumption record (if any) corresponding to the identification code 16a in the power consumption recording table 24 and a login state into the first smart tag. If no personal power consumption record in the power consumption recording table 24 corresponds to the identification code 16a, the sensing interface 17 takes zero as the personal power consumption record and writes it into the first smart tag. Through writing the login state into the first smart tag, the first user can read the "login state" if he/she inquires the content of the first smart tag subsequently and learn therefrom that a power consumption record of the first smart tag is lack of a latest power consumption amount. At this point, the first user has joined in sharing of the electric appliance 14.

Then, a second user also wants to share the use of the electric appliance 14 and places his/her second smart tag within the signal coverage of the sensing interface 17. The sensing interface 17 accordingly senses an identification signal 14b from the second smart tag and transmits it to the processing unit 23. After the processing unit 23 receives the identification signal 14b, the processing unit 23 defines a time point t2 accordingly and defines a time interval T1 according to the time point t2 and the time point t1. The time interval T1 may be regarded as the current time interval at this stage. The identification signal 14b sensed by the sensing interface 17 carries an identification code 16b of the second smart tag therein. The processing unit 23 determines that the identification code 16b is not recorded in the user identification list of the user list 20, so it adds the identification code 16b into the user identification list of the user list 20 and increases the user number by one. In addition, the sensing interface 17 writes a personal power consumption record (if any) corresponding to the identification code 16b in the power consumption recording table 24 and a login state into the second smart tag. If no personal power consumption record in the power consumption recording table 24 corresponds to the identification code 16b, the sensing interface 17 takes zero as the personal power consumption record and writes it into the second smart tag. At this point, the second user has joined in sharing of the electric appliance 14.

On the other hand, the power consumption measurement and control unit 15 continuously measures the power consumption amount of the electric appliance 14 (i.e., the power consumption amount flowing out the power output line 13), so the processing unit 23 can calculate the interval power consumption of the electric appliance 14 within the time interval T1 accordingly. Then, the processing unit 23 calculates the interval individual power consumption amount within the time interval T1 according to the interval power consumption amount and the user number (i.e., one) within the time interval T1. This interval individual power consumption amount represents the power consumption apportioned to each individual user of the electric appliance 14 within the time interval T1. Specifically, the processing unit 23 may take the result of dividing the interval power consumption amount within the time interval T1 by the user number within the time interval T1 as the interval individual power consumption amount within the time interval T1. The processing unit 23 retrieves a personal power consumption record 40a of the identification code 16a from the power consumption recording table 24 according to the identification code 16a recorded in the user identification list corresponding to the time interval T1. Then, the processing unit 23 adds the interval individual power consumption amount within the time interval T1 to the personal power consumption record 40a. If no record of the identification code 16a is included in the power consumption recording table 24 initially, the processing unit 23 will write the interval individual power consumption amount within the time interval T1 into the power consumption recording table 24 as the personal power consumption record 40a corresponding to the identification code 16a. In this case, the personal power consumption record 40a represents the accumulative power consumption apportioned to the first user between the time when the first user joins in sharing the use of the electric appliance 14 and the time point t2.

When the first user wants to withdraw from sharing the electric appliance 14, he/she places his/her first smart tag within the signal coverage of the sensing interface 17. The sensing interface 17 senses an identification signal 18a from the first smart tag and transmits it to the processing unit 23. After the processing unit 23 receives the identification signal 18a, the processing unit 23 defines a time point t3 accordingly and defines a time interval T2 according to the time point t3 and the time point t2. The time interval T2 may be regarded as the current time interval at this stage. The identification signal 18a sensed by the sensing interface 17 carries the identification code 16a of the first smart tag therein. The processing unit 23 determines that the identification code 16a has been recorded in the user identification list of the user list 20 and then deletes the identification code 16a from the user identification list of the user list 20 and decreases the user number by one.

Furthermore, the power consumption measurement and control unit 15 continuously measures the power consumption amount of the electric appliance 14, so the processing unit 23 can calculate the interval power consumption amount of the electric appliance 14 within the time interval T2 accordingly. Then, the processing unit 23 calculates the interval individual power consumption amount within the time interval T2 according to the interval power consumption amount and the user number (i.e., two) within the time interval T2. Specifically, the processing unit 23 may take the result of dividing the interval power consumption amount within the time interval T2 by the user number within the time interval T2 as the interval individual power consumption amount within the time interval T2. The processing unit 23 retrieves the personal power consumption record 40a of the identification code 16a and the personal power consumption record 40b of the identification code 16b from the power consumption recording table 24 according to the identification codes 16a, 16b recorded in the user identification list of the time interval T2. The processing unit 23 adds the interval individual power consumption amount within the time interval T2 to the personal power consumption record 40a and adds the interval individual power consumption amount within the time interval T2 to the personal power consumption record 40b. If no record of the identification code 16b is included in the power consumption recording table 24 initially, the processing unit 23 writes the interval individual power consumption amount within the time interval T2 into the power consumption recording table 24 as the personal power consumption record 40b corresponding to the identification code 16b. In this case, the personal power consumption record 40a represents the accumulative power consumption apportioned to the first user between the time when the first user joins in sharing the use of the electric appliance 14 and the time point t3, while the personal power consumption record 40b represents the accumulative power consumption apportioned to the second user between the time when the second user joins in sharing the use of the electric appliance 14 and the time point t3.

On the other hand, the sensing interface 17 writes the personal power consumption record 40a and a logout state into the first smart tag. The user can read the "logout state" if he/she inquires the content of the first smart tag subsequently and learns therefrom that all the power consumption records have been recorded into the first smart tag. In other words, the power consumption records in the first smart tag at this stage have been recorded (i.e., the power consumption has been completely recorded). It shall be appreciated that after the first user has withdrawn from sharing the use of the electric appliance 14, the personal power consumption record 40a of the first user is still kept in the power consumption measurement and control apparatus 4 for subsequent accumulation and for recording the total accumulative power consumption amount.

Thereafter, a third user wants to join in sharing the use of the electric appliance 14 and places his/her third smart tag within the signal coverage of the sensing interface 17. Accordingly, the sensing interface 17 senses an identification signal 14c from the third smart tag and transmits it to the processing unit 23. After the processing unit 23 receives the identification signal 14c, the processing unit 23 defines a time point t4 accordingly and defines a time interval T3 according to the time point t4 and the time point t3. The time interval T3 may be regarded as the current time interval at this stage. The identification signal 14c sensed by the sensing interface 17 carries an identification code 16c of the third smart tag. The processing unit 23 determines that the identification code 16c is not recorded in the user identification list of the user list 20, so it adds the identification code 16c into the user identification list of the user list 20 and increases the user number by one. On the other hand, the sensing interface 17 writes a personal power consumption record (if any) corresponding to the identification code 16c in the power consumption recording table 24 and a login state into the third smart tag. If no personal power consumption record in the power consumption recording table 24 corresponds to the identification code 16c, the sensing interface 17 will take zero as the personal power consumption record and write it into the third smart tag. At this point, the third user has joined in sharing the use of the electric appliance 14.

The power consumption measurement and control unit 15 continuously measures the power consumption amount of the electric appliance 14, so the processing unit 23 can calculate the interval power consumption amount of the electric appliance 14 within the time interval T3 accordingly. Then, the processing unit 23 calculates the interval individual power consumption amount within the time interval T3 according to the interval power consumption amount and the user number (i.e., one) within the time interval T3. The processing unit 23 may take the result of dividing the interval power consumption amount within the time interval T3 by the user number within the time interval T3 as the interval individual power consumption amount within the time interval T3. The processing unit 23 retrieves the personal power consumption record 40b of the identification code 16b from the power consumption recording table 24 according to the identification code 16b recorded in the user identification list of the time interval T3. Then, the processing unit 23 adds the interval individual power consumption amount within the time interval T3 to the personal power consumption record 40b. In this case, the personal power consumption record 40b represents the accumulative power consumption amount apportioned to the second user between the time when the second user joins in sharing the use of the electric appliance 14 and the time point t4.

When the third user wants to withdraw from sharing the electric appliance 14, he/she places his/her third smart tag within the signal coverage of the sensing interface 17. Accordingly, the sensing interface 17 senses an identification signal 18c from the third smart tag and transmits it to the processing unit 23. After the processing unit 23 receives the identification signal 18c, the processing unit 23 defines a time point t5 accordingly and defines a time interval T4 according to the time point t5 and the time point t4. The time interval T4 may be regarded as the current time interval at this stage. The identification signal 18c sensed by the sensing interface 17 carries the identification code 16c of the third smart tag therein. The processing unit 23 determines that the identification code 16c has been recorded in the user identification list of the user list 20, so it deletes the identification code 16c from the user identification list of the user list 20 and decreases the user number by one.

Furthermore, the power consumption measurement and control unit 15 can measure the interval power consumption amount of the electric appliance 14 within the time interval T4. The processing unit 23 calculates the interval individual power consumption amount within the time interval T4 according to the interval power consumption amount and the user number (i.e., two) within the time interval T4. Specifically, the processing unit 23 may take the result of dividing the interval power consumption amount within the time interval T4 by the user number within the time interval T4 as the interval individual power consumption amount within the time interval T4. The processing unit 23 retrieves the personal power consumption record 40b of the identification code 16b and a personal power consumption record 40c (if any) of the identification code 16c from the power consumption recording table 24 according to the identification codes 16b, 16c recorded in the user identification list corresponding to the time interval T4. The processing unit 23 adds the interval individual power consumption amount within the time interval T4 to the personal power consumption record 40b and adds the interval individual power consumption amount within the time interval T2 into the personal power consumption record 40c. If no record of the identification code 16c is included in the power consumption recording table 24 initially, the processing unit 23 writes the interval individual power consumption amount within the time interval T4 into the power consumption recording table 24 as the personal power consumption record 40c corresponding to the identification code 16c.

Since the third user has withdrawn from sharing the use of the electric appliance 14, the sensing interface 17 writes the personal power consumption record 40c and a logout state into the third smart tag. The user can read the "logout state" if he/she inquires the content of the third smart tag subsequently and then learn therefrom that all the power consumption records have been recorded into the third smart tag. In other words, the power consumption records in the third smart tag at this stage have been recorded (i.e., the power consumption have been completely recorded). It shall be appreciated that after the third user has withdrawn from sharing the use of the electric appliance 14, the personal power consumption record 40c of the third user will still be kept in the power consumption measurement and control apparatus 4 for subsequent accumulation and for recording the total accumulative power consumption.

When the second user also wants to withdraw from sharing the electric appliance 14, he/she places his/her second smart tag within the signal coverage of the sensing interface 17. Accordingly, the sensing interface 17 senses an identification signal 18b from the second smart tag and transmits it to the processing unit 23. After the processing unit 23 receives the identification signal 18b, the processing unit 23 defines a time point t6 accordingly and defines a time interval T5 according to the time point t6 and the time point t5. The identification signal 18b sensed by the sensing interface 17 carries the identification code 16b of the second smart tag therein. The processing unit 23 determines that the user number is one and the identification code 16b has been recorded in the user identification list of the user list 20, so the processing unit 23 turns off the logic switch 15a, deletes the identification code 16b from the user identification list of the user list 20, and decreases the user number by one.

Moreover, the power consumption measurement and control unit 15 can measure the interval power consumption amount of the electric appliance 14 within the time interval T5. The processing unit 23 calculates the interval individual power consumption amount within the time interval T5 according to the interval power consumption amount and the user number (i.e., one) within the time interval T5. Specifically, the processing unit 23 may take the result of dividing the interval power consumption amount within the time interval T5 by the user number within the time interval T5 as the interval individual power consumption amount within the time interval T5. The processing unit 23 retrieves the personal power consumption record 40b of the identification code 16b from the power consumption recording table 24 according to the identification code 16b recorded in the user identification list corresponding to the time interval T5. Then, the processing unit 23 adds the interval individual power consumption amount within the time interval T5 to the personal power consumption record 40b. In this case, the personal power consumption record 40*b* represents the accumulative power consumption apportioned to the second user between the time when the second user joins in sharing the use of the electric appliance 14 and the time point t6.

On the other hand, the sensing interface 17 writes the personal power consumption record 40*b* and a logout state into the second smart tag. The user can read the "logout state" if he/she inquires the content of the second smart tag subsequently and then learns therefrom that all the power consumption records have been recorded into the second smart tag. In other words, the power consumption record in the second smart tag at this stage have been recorded (i.e., the power consumption has been completely recorded). It shall be appreciated that since the logic switch 15*a* has been turned off at the time point t6, the user number of a time interval T6 after the time point t6 is zero. Furthermore, after the second user has withdrawn from sharing the use of the electric appliance 14, the personal power consumption record 40*b* of the second user will still be kept in the power consumption measurement and control apparatus 4 for subsequent accumulation and for recording the total accumulative power consumption.

It shall be appreciated that if the aforesaid smart tags are included in a smart mobile apparatus in which a corresponding application software is installed, the user can read the power consumption and the state (i.e., the login state or the logout state) carried by the smart tags through the application software. Furthermore, if another electronic apparatus is installed with the application software through which the content carried by the smart tag can be read, the user can also read the total power consumption and the state carried by the smart tag through the application software of the electronic apparatus. If the "logout state" is read by the user from a smart tag, it can be learned therefrom that the power consumption record has been recorded (i.e., the power consumption has been completely recorded). If the "login state" is read by the user from a smart tag, it can be learned therefrom that the power consumption record of the smart tag is lack of a latest power consumption amount.

It shall be appreciated that in other embodiments of the present invention, the power consumption measurement and control apparatus may further comprise a display unit (not shown). In these embodiments, when the sensing interface 17 senses an identification signal (e.g., the aforesaid identification signals 14*a*, 14*b*, 14*c*, 18*a*, 18*b*, 18*c*) and determines that the user joins in or withdraws from sharing the use of the electric appliance 14 according to the identification signal, the display unit can display the personal power consumption record corresponding to the identification code carried in the identification signal for reference when a user decides to join in or withdraw from sharing the use of the electric appliance.

As described above, in other embodiments of the present invention, the sensing interface may also be a sensor which can sense various biometric features (e.g., fingerprint, shape of the palm, voice, etc.). Since data cannot be written into these biometric features, the power consumption measurement and control apparatus (i.e., will not be written into the login state, the logout state and the personal power consumption record) will not write data into these biometric features in these embodiments. Accordingly, in these embodiments, the power consumption record stored into the power consumption measurement and control apparatus has to keep all the records of the identification codes so that the records can be read and used by the administrator.

Moreover, in other embodiments of the present invention, the power output line of the power consumption measurement and control apparatus may be connected to a plurality of electric appliances (e.g., an air conditioner and a projector in a same meeting room) at the same time. In these embodiments, the power consumption amount measured by the power consumption measurement and control unit is the power consumption amount of all the electric appliances. When the processing unit subsequently calculates the individual power consumption amount of a certain time interval, the calculation is performed with respect to the power consumption amount of all the electric appliances.

As can be known from the above descriptions, the power consumption measurement and control apparatus 4 defines a time interval and calculates the interval individual power consumption of each user within this time interval when an identification signal is sensed by the sensing interface 17 in this embodiment. Furthermore, the power consumption measurement and control apparatus 4 also determines whether the identification code carried by the sensed identification signal corresponds to a login behavior or a logout behavior and timely writes the personal power consumption record corresponding to the identification code into the smart tag. Through the power consumption measurement and control apparatus 4, the power consumption apportioned to each user (or the electric charge apportioned to each user) can be calculated reasonably when several users join in sharing the use of the electric appliance 14.

Figure 4C:
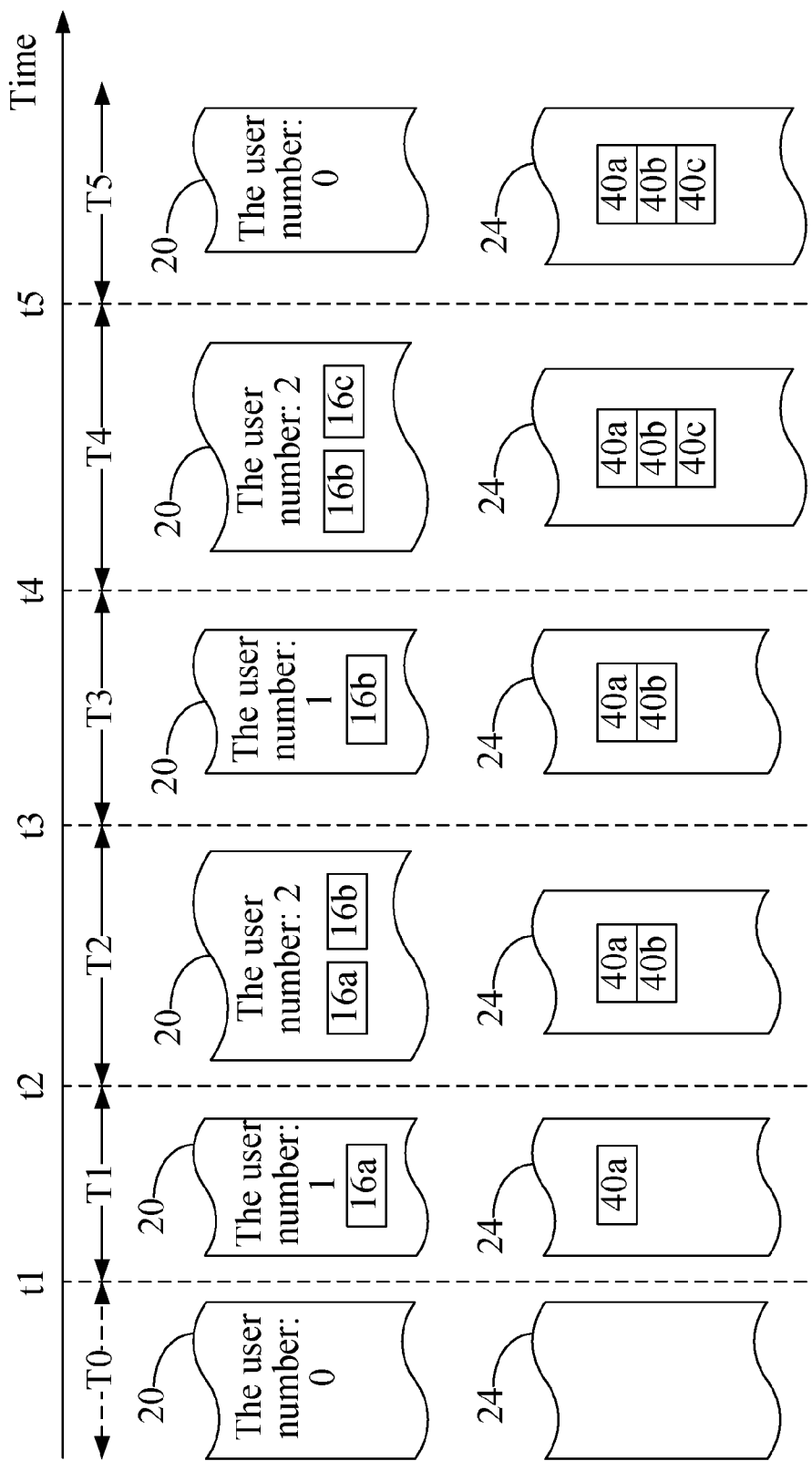
FIG. 4C depicts a user list and a power consumption recording table of the sixth embodiment of the present invention.

A sixth embodiment of the present invention is also the power consumption measurement and control apparatus 4; however, the power consumption measurement and control apparatus 4 operates slightly different from that described in the fifth embodiment. Hereinafter, only the differences between the two embodiments will be described with reference to FIG. 4A and FIG. 4C. FIG. 4C depicts the content of the user list 20 and the power consumption recording table 24 of different time intervals in this embodiment.

In this embodiment, it is assumed that the electric appliance 14 connected to the power consumption measurement and control apparatus 4 has a switch. If any user wants to withdraw from sharing the use of the electric appliance 14, he/she may place his/her smart tag within the signal coverage of the sensing interface 17 and move the smart tag close to the sensing interface 17. If any user wants to terminate the use of the electric appliance 14, he/she may turn off the switch 21 of the electric appliance 14 or press the button 19.

In this embodiment, all the operations before the time point t5 are the same as those of the fifth embodiment and, so the details will not be further described herein. It is assumed that the third user stops using the electric appliance 14 by turning off the switch of the electric appliance 14 in this embodiment. After the switch of the electric appliance 14 is turned off, the processing unit 23 determines that the power consumption amount flowing out the power output line 13, which is measured by the power consumption measurement and control unit 15, is below a predetermined threshold over a predetermined time interval (e.g., 3 seconds), and then the processing unit 23 defines a time point t5 accordingly.

The processing unit 23 defines the time interval T4 according to the time point t4 and the time point t5 and calculates the interval individual power consumption amount within the time interval T4 according to the interval power consumption amount and the user number (i.e., two) within the time interval T4. Thereafter, the processing unit 23 retrieves the personal power consumption records 40*b*, 40*c* corresponding to the identification codes 16*b*, 16*c* respectively from the power consumption recording table 24 according to the identification codes 16*b*, 16*c* recorded in the user identification list of the time interval T4. The processing unit 23 adds the interval individual power consumption amount within the time interval T4 to the personal power consumption record 40b and adds the interval individual power consumption amount within the time interval T4 to the personal power consumption record 40c. If no record of the identification code 16c is included in the power consumption recording table 24 initially, the processing unit 23 writes the interval individual power consumption amount within the time interval T4 into the power consumption recording table 24 as the personal power consumption record 40c corresponding to the identification code 16c. In this case, the personal power consumption record 40b represents the accumulative power consumption amount apportioned to the second user between the time when the second user joins in sharing the use of the electric appliance 14 and the time point t5, while the personal power consumption record 40c represents the accumulative power consumption amount apportioned to the third user between the time when the third user joins in sharing the use of the electric appliance 14 and the time point t5. However, the sensing interface 15 will not perform any writing actions because neither the second smart tag nor the third smart tag is sensed. In other words, the latest personal power consumption records 40b, 40c of the identification codes 16b, 16c are not written into the second smart tag and the third smart tag.

It shall be appreciated that the third user can also terminate using the electric appliance 14 by pressing the button 19. If the third user presses the button 19, the button 19 transmits a triggering signal to the processing unit 23 and a time point t5 is defined accordingly by the processing unit 23. Thereafter, the aforesaid operations will also be executed in this embodiment.

If the second/third user reads the total power consumption and the state carried by the second/third smart tag through the application software installed in a smart mobile apparatus or some other electric apparatus, the second/third user will learn that the state is a login state. When the second/third user learns that the state carried by the second/third smart tag is a login state, he/she will learn that the latest power consumption amount is not included in the personal power consumption record recorded on the smart tag.

As can be known from the above descriptions, this embodiment can achieve all the efficacies of the fifth embodiment. Besides, when the user terminates the use of the electric appliance 14 in other ways (i.e., by turning off the switch of the electric appliance 14), the power consumption measurement and control apparatus 4 still can write the latest personal power consumption record of a user into the smart tag when the user logs into the power consumption measurement and control apparatus 4 next time.

Figure 5:
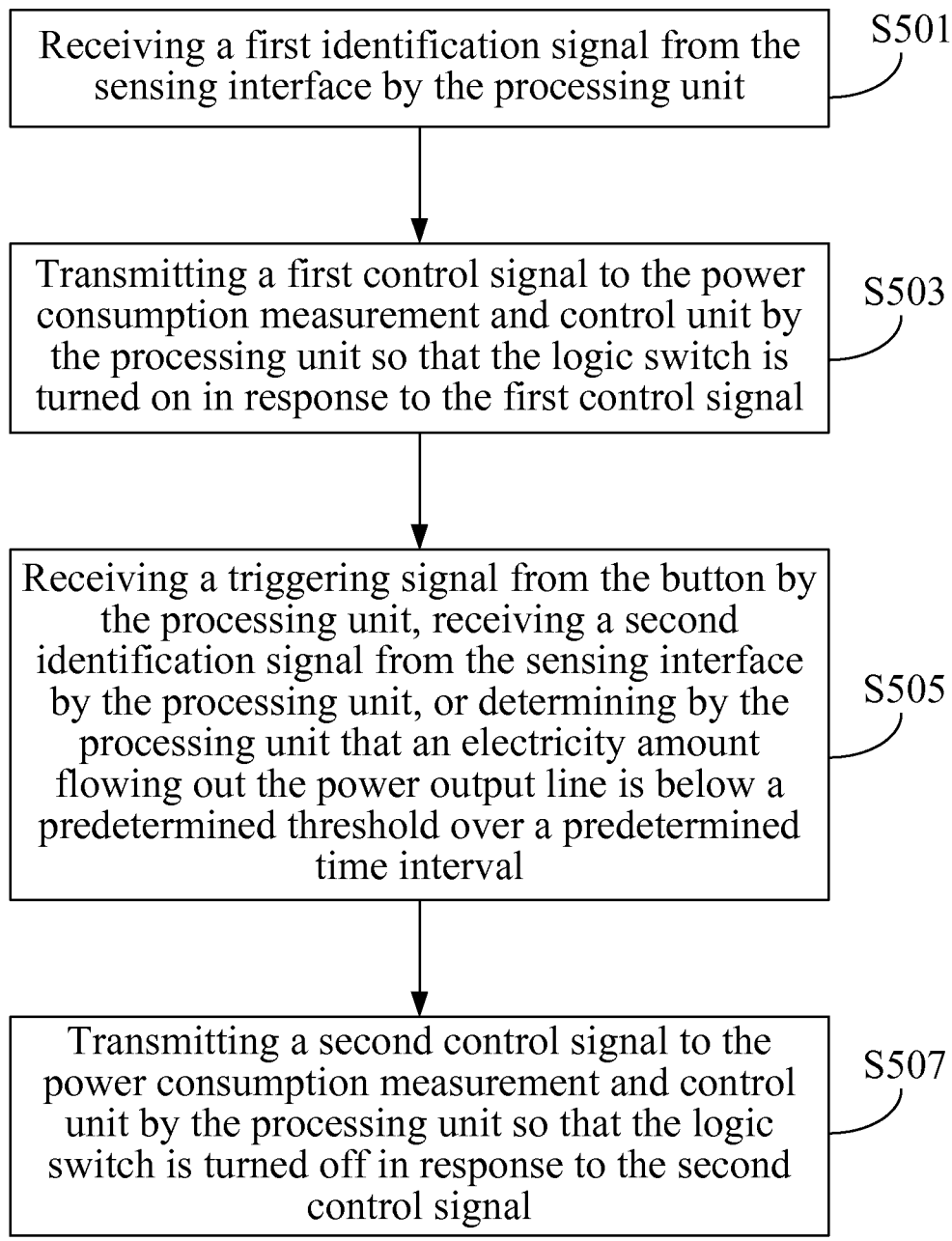
FIG. 5 is a schematic flowchart diagram of a seventh embodiment of the present invention.

A seventh embodiment of the present invention is a power consumption measurement and control method, a flowchart diagram of which is depicted in FIG. 5. The power consumption measurement and control method is adapted for a power consumption measurement and control apparatus (e.g., the aforesaid power consumption measurement and control apparatuses 1, 2). The power consumption measurement and control apparatus comprises a power input line, a power output line, a sensing interface, a button, a processing unit, and a power consumption measurement and control unit. The processing unit is electrically connected to the button, the sensing interface, and the power consumption measurement and control unit. The power consumption measurement and control unit comprises a logic switch, wherein the logic switch is connected to the power input line and the power output line. The power consumption measurement and control unit can measure a power consumption amount flowing out the power output line. The logic switch is off initially.

Firstly, step S501 is executed to receive a first identification signal from the sensing interface by the processing unit. Since the logic switch is off and the first identification signal is sensed by the sensing interface, step S503 is executed to transmit a first control signal to the power consumption measurement and control unit by the processing unit so that the logic switch is turned on in response to the first control signal.

Next, step S505 is executed to receive a triggering signal from the button by the processing unit, or to receive a second identification signal from the sensing interface by the processing unit, or to determine by the processing unit that a power consumption amount flowing out from the power output line, which is measured by the power consumption measurement and control unit, is below a predetermined threshold over a predetermined time interval. Thereafter, step S507 is executed to transmit a second control signal to the power consumption measurement and control unit by the processing unit so that the logic switch is turned off in response to the second control signal.

In other embodiments of the present invention, if the power input line is connected to a power source, the power consumption measurement and control method may further comprise other steps. Specifically, a step (not shown) may be executed by the power consumption measurement and control method to receive a basic power value. Then, another step (not shown) may be executed to enable the power consumption measurement and control unit to set a basic power value. In this way, the power source supplies the basic power value to the power consumption measurement and control apparatus when the logic switch is turned off. The aforesaid basic power value is a current value that allows the electric appliance to perform a hot standby operation and/or a cooling operation.

In other embodiments of the present invention, if the power consumption measurement and control apparatus comprises a storage unit that has a key stored therein, the power consumption measurement and control method further needs to execute a step to perform the verification procedure. Specifically, the first identification signal received in the step S501 carries a verification data therein. Next, a step (not shown) will be executed by the power consumption measurement and control method to perform a verification procedure on the verification data by using the key. Only when the verification data passes the verification procedure will the step S503 be executed to turn on the logic switch.

In other embodiments of the present invention, a step (not shown) will further be executed by the power consumption measurement and control method to enable the power consumption measurement and control unit to record an interval power consumption amount of the time interval when the logic switch is on.

In addition to the aforesaid steps, the seventh embodiment can also execute all the operations and functions set forth in the first embodiment to the third embodiment. How the seventh embodiment executes these operations and functions will be readily appreciated by those of ordinary skill in the art based on the explanation of the first embodiment to the third embodiment, and thus will not be further described herein.

Figure 6A:
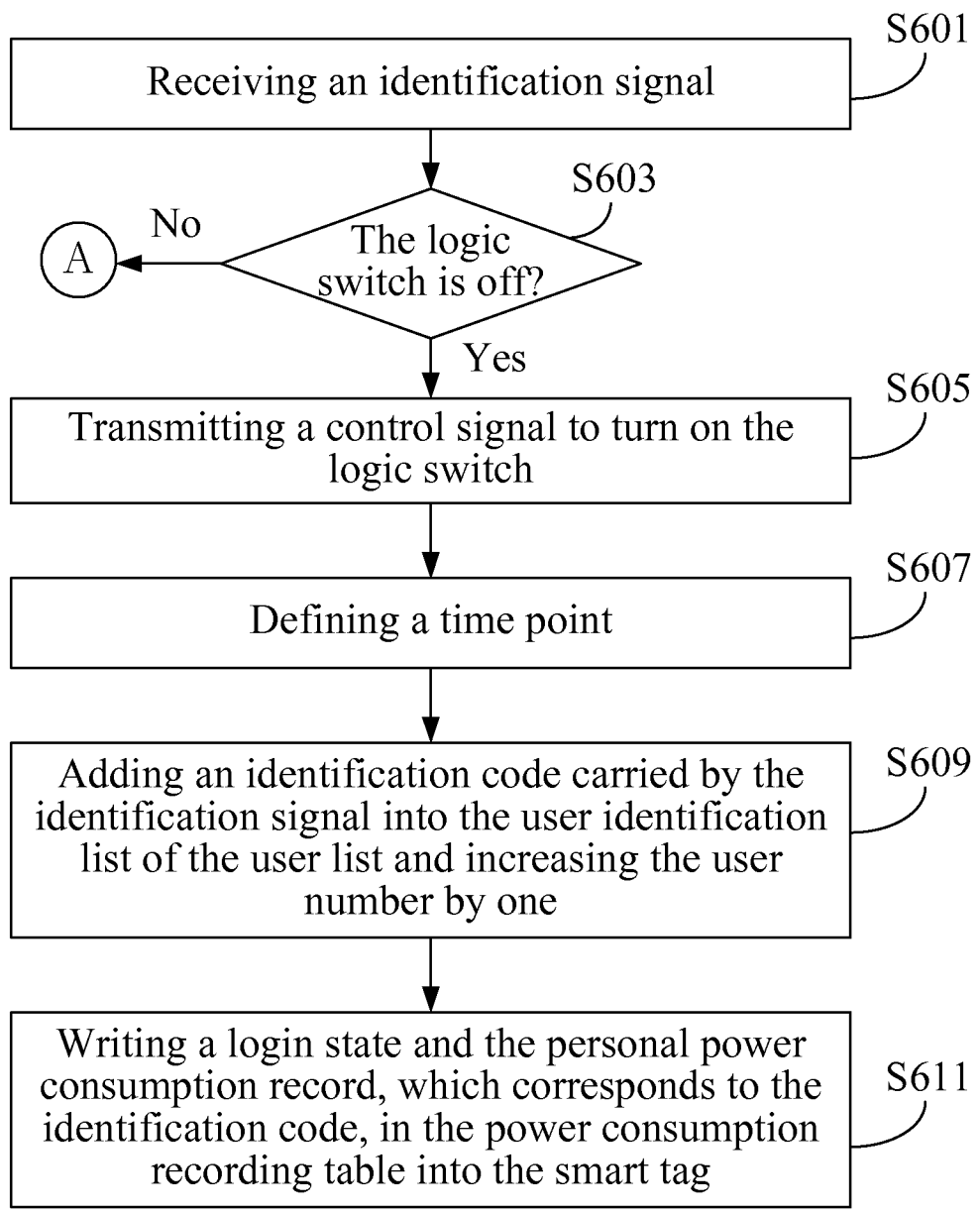
FIG. 6A, FIG. 6B, and FIG. 6C are schematic flowchart diagrams of the seventh embodiment of the present invention.
Figure 6B:
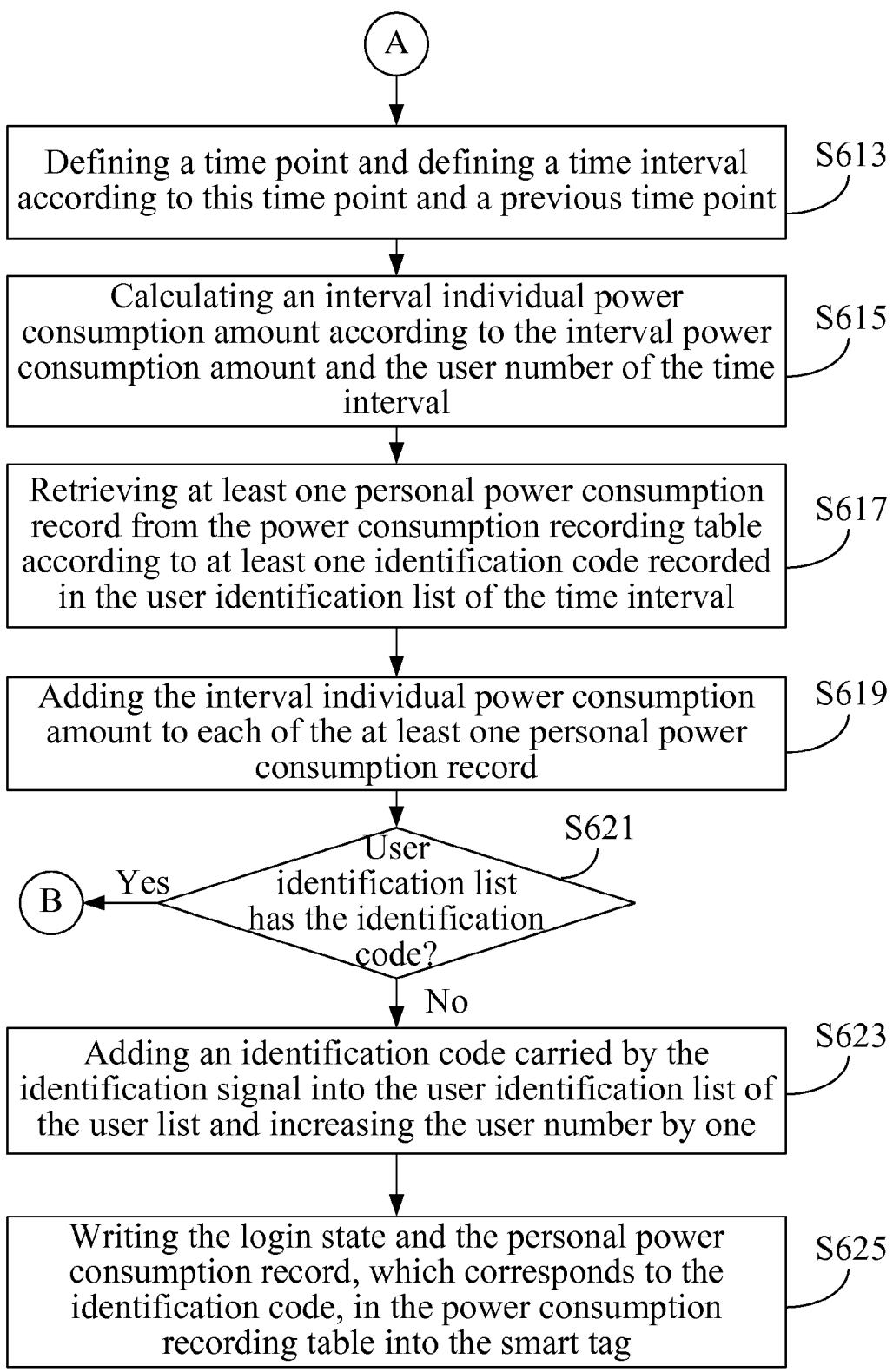
Figure 6C:
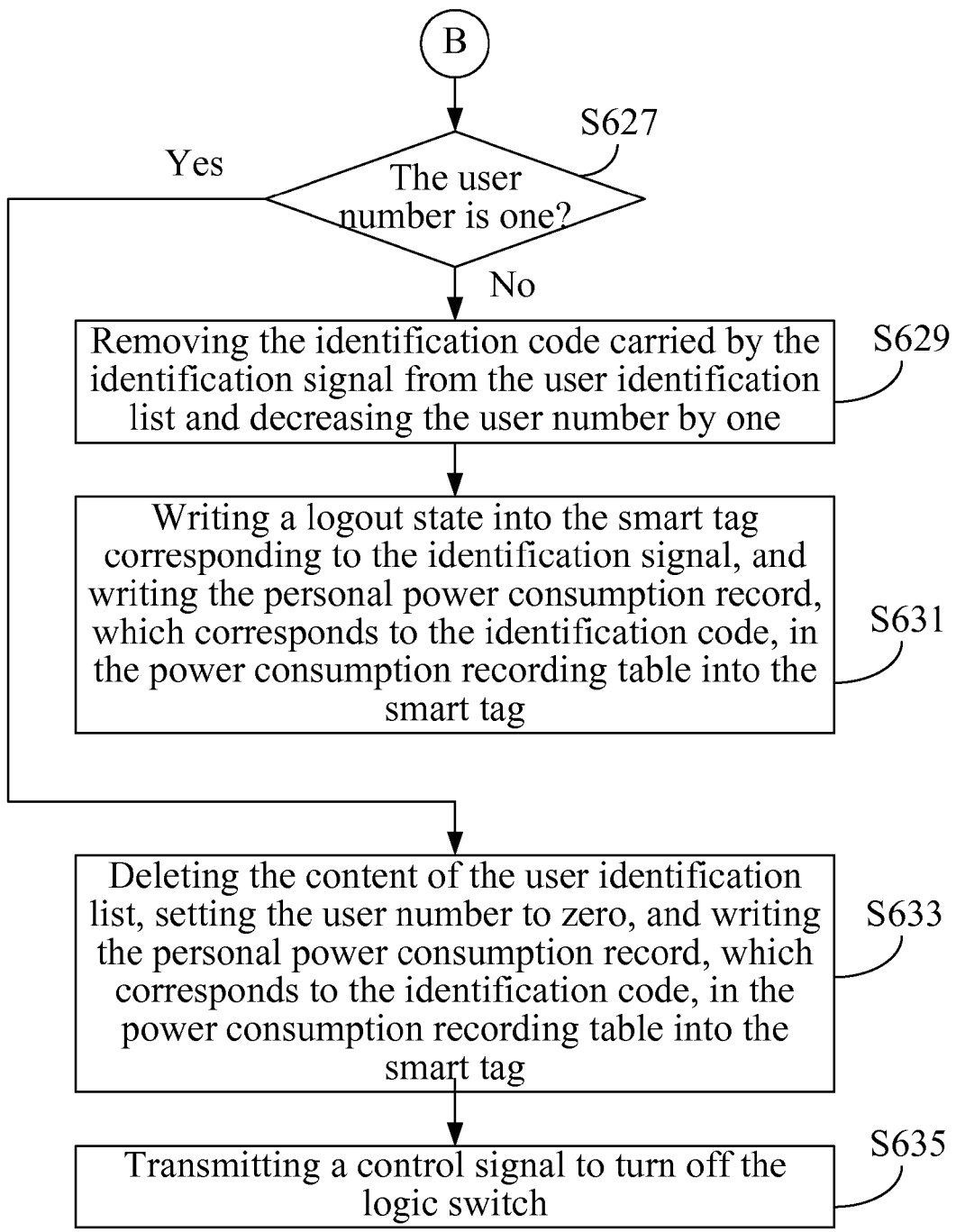

An eighth embodiment of the present invention is a power consumption measurement and control method, a flowchart diagram of which is depicted in FIG. 6A, FIG. 6B, and FIG.

6C. The power consumption measurement and control method is adapted for a power consumption measurement and control apparatus (e.g., the aforesaid power consumption measurement and control apparatuses 3, 4). The power consumption measurement and control apparatus comprises a power input line, a power output line, a sensing interface, a power consumption measurement and control unit, a button, a processing unit, and a storage unit. The power consumption measurement and control unit comprises a logic switch, wherein the logic switch is connected to the power input line and the power output line. The power consumption measurement and control unit can measure a power consumption amount flowing out the power output line. The storage unit is stored with a user list, wherein the user list records a user number and a user identification list of a current time interval.

The power consumption measurement and control method is adapted for use in cases where an identification signal is sensed by the sensing interface of the power consumption measurement and control apparatus. Firstly, step S601 is executed to receive an identification signal from the sensing interface by the processing unit. Next, step S603 is executed to determine whether the logic switch is off. If the result of the determination is "Yes" in the step S603, then step S605 is executed to transmit a control signal to the power consumption measurement and control unit by the processing unit so that the logic switch is turned on in response to the control signal. Next, step S607 is executed to define a time point by the processing unit. Then, step S609 is executed by the processing unit to add an identification code carried by the identification signal into the user identification list of the user list and increase the user number by one. Thereafter, step S611 is executed to writes a login state and the personal power consumption record, which corresponds to the identification code, in the power consumption recording table into a smart tag corresponding to the identification signal.

If the result of the determination is "No" in the step S603 (i.e., the logic switch is on), then step S613 is executed to define a time point and define a time interval according to this time point and a previous time point. Step S615 is executed to calculate an interval individual power consumption amount according to the interval power consumption amount and the user number of the time interval. Step S617 is executed to retrieve at least one personal power consumption record from the power consumption recording table according to at least one identification code recorded in the user identification list of the time interval, wherein the at least one personal power consumption record corresponds to the at least one identification code. Step S619 is executed to add the interval individual power consumption to each of the at least one personal power consumption record.

Next, step S621 is executed to determine whether the identification code is included in the identification listing. If the result of the determination is "No" in the step S621, step S623 is executed to add an identification code carried by the identification signal into the user identification list of the user list and increase the user number by one. Thereafter, step S625 is executed to writes the login state and the personal power consumption record, which corresponds to the identification code, in the power consumption recording table into the smart tag.

If the result of the determination is "Yes" in the step S621, step S627 is executed to determine whether the user number is one. If the result of the determination is "No" in the step S627, step S629 is executed to remove the identification code carried by the identification signal from the user identification list and decrease the user number by one. Then, step S631 is executed to write a logout state into the smart tag corresponding to the identification signal and write the personal power consumption record, which corresponds to the identification code, in the power consumption recording table into the smart tag. If the result of the determination is "Yes" in the step S627, step S633 is executed to delete the content of the user identification list, set the user number to zero, and write the personal power consumption record, which corresponds to the identification code, in the power consumption recording table into the smart tag. Thereafter, step S635 is executed to transmit another control signal to the power consumption measurement and control unit by the processing unit so that the logic switch is turned off in response to the another control signal.

In addition to the aforesaid steps, the eighth embodiment can also execute all the operations and functions set forth in the fourth embodiment to the sixth embodiment. How the eighth embodiment executes these operations and functions will be readily appreciated by those of ordinary skill in the art based on the explanation of the fourth embodiment to the sixth embodiment, and thus will not be further described herein.

Moreover, the power consumption measurement and control method set forth in the seventh embodiment and the eighth embodiment may be implemented by a computer program. After the computer program is loaded into an electronic apparatus, the computer program executers the power consumption measurement and control method set forth in the seventh embodiment and the eighth embodiment can be completed. The aforesaid non-transitory computer readable storage medium may be a read only memory (ROM), a flash memory, a floppy disk, a hard disk, a compact disk, a mobile disk, a database accessible to networks, or any other storage media with the same function and well known to those skilled in the art.

The present invention provides a special power consumption measurement and control apparatus, method, and non-transitory computer readable storage medium thereof. When the logic switch of the power consumption measurement and control apparatus is off and the processing unit receives an identification signal from the sensing interface, the processing unit transmits a control signal to the power consumption measurement and control unit so that the logic switch is turned on correspondingly. On the other hand, the power consumption measurement and control apparatus of the present invention can have its logic switch turned off in the following three ways of: (i) receiving a triggering signal from a button by the processing unit, (ii) receiving another identification signal from the sensing interface by the processing unit, and (iii) determining by the processing unit that a power consumption amount flowing out the power output line, which is measured by the power consumption measurement and control unit, is below a predetermined threshold over a predetermined time interval. Therefore, the user can turn on and turn off the power consumption measurement and control apparatus in various different ways.

Moreover, the present invention is able to define a plurality of time points and defines a time interval every two consecutive time points. Then, the interval power consumption amount flowing out the power output line within each time interval is calculated and the interval individual power consumption amount of each user within this time interval is calculated. In the present invention, the time points may be defined by the power consumption measurement and control apparatus in response to different behaviors (e.g., (i) the sensing interface included in the power consumption measurement and control apparatus senses an identification signal, (ii) a power consumption amount flowing out the power output line is below a predetermined threshold over a predetermined time interval when the user turns off the electric appliance directly, and/or (iii) the user presses the button so that a triggering signal is generated by the button).

Furthermore, the power consumption measurement and control apparatus, method, and non-transitory computer readable storage medium thereof provided in the present invention also determine whether the identification code carried by the sensed identification signal corresponds to a login behavior or a logout behavior and record the total power consumption amount corresponding to the identification code timely (e.g., write the total power consumption corresponding to the identification code into the smart tag). With the power consumption measurement and control technology provided in the present invention, the power consumption amount apportioned to each user (or the electric charge apportioned to each user) can be calculated reasonably when several users share the use of an electric appliance together.

The above disclosure is related to the detailed technical content and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A power consumption measurement and control apparatus comprising:
   a power input line;
   a power output line;
   a sensing interface;
   a power consumption measurement and control unit, comprising a logic switch connected to the power input line and the power output line, wherein the power consumption measurement and control unit further measures a power consumption amount flowing out the power output line;
   a processing unit, being electrically connected to the sensing interface and the power consumption measurement and control unit; and
   a storage unit, being stored with a user list and a power consumption recording table, wherein a user number and a user identification list is recorded in the user list,
   wherein the processing unit transmits a first control signal to the power consumption measurement and control unit and the logic switch is turned on in response to the first control signal when the logic switch is off and the processing unit receives a first identification signal from the sensing interface,
   wherein the processing unit transmits a second control signal to the power consumption measurement and control unit and the logic switch is turned off in response to the second control signal when the logic switch is on and one of the following conditions happens: (a) the processing unit receives a second identification signal from the sensing interface and (b) the processing unit determines that the power consumption amount is below a predetermined threshold over a predetermined time interval,
   wherein the processing unit further receives a plurality of identification signals from the sensing interface,
   wherein for each of the identification signals: (c) the processing unit further compares an identification code carried by the identification signal with the user identification list after the processing unit receives the identification signal from the sensing interface, (d) when the identification code is not included in the user identification list, the processing unit writes the identification code into the user identification list and increases the user number by one, and (e) when the identification code is included in the user identification list, the processing unit removes the identification code from the user identification list and decreases the user number by one.

2. The power consumption measurement and control apparatus as claimed in claim 1, further comprising:
   a button, being electrically connected to the processing unit,
   wherein the processing unit transmits the second control signal to the power consumption measurement and control unit and the logic switch is turned off in response to the second control signal when the logic switch is on and the processing unit receives a triggering signal from the button.

3. The power consumption measurement and control apparatus as claimed in claim 2,
   wherein after the processing unit receives the first identification signal from the sensing interface, the processing unit further adds a first identification code carried by the first identification signal into the user identification list and the processing unit increases the user number by one,
   wherein the processing unit deletes the content of the user identification list and sets the user number to zero when one of the following conditions happens: the processing unit receives the triggering signal from the button and the processing unit determines that the power consumption amount is below the predetermined threshold over the predetermined time interval.

4. The power consumption measurement and control apparatus as claimed in claim 1,
   wherein after the processing unit receives the first identification signal from the sensing interface, the processing unit further adds a first identification code carried by the first identification signal into the user identification list and the processing unit increases the user number by one,
   wherein when the logic switch is on and the processing unit receives the second identification signal from the sensing interface, the switch logic will be turned off when the following conditions happen: (f) the processing unit determines that an identification code carried by the second identification signal has been stored in the user identification list and (g) the processing unit determines that the user number is one, and wherein the processing unit further deletes the content of the user identification list and sets the user number to zero.

5. The power consumption measurement and control apparatus as claimed in claim 1, wherein the power input line is connected to a power source and the power consumption measurement and control unit sets a basic power value when the logic switch is turned off so that the power source supplies the basic power value to an electric appliance, wherein the basic power value is a power value that allows the electric appliance to perform one of a hot standby operation, a cooling operation, and a combination thereof.

6. The power consumption measurement and control apparatus as claimed in claim 1, wherein the storage unit is further stored with a key,
the processing unit performs a verification procedure on a verification datum carried by the first identification signal by using the key when the processing unit receives the first identification signal from the sensing interface, and the logic switch is turned on when the verification data passes the verification procedure.

7. The power consumption measurement and control apparatus as claimed in claim 1, wherein the logic switch is on over a time interval and the power consumption measurement and control unit further records an interval power consumption amount flowing out the power output line within the time interval.

8. The power consumption measurement and control apparatus as claimed in claim 1, wherein the logic switch is on over a plurality of time intervals, the power consumption measurement and control unit further records an interval power consumption amount flowing out the power output line within each of the time intervals, and the processing unit further cumulates the interval power consumption amounts into an accumulative power consumption amount.

9. The power consumption measurement and control apparatus as claimed in claim 2, wherein the processing unit further individually defines a time point when one of the following conditions happens: when the processing unit receives each of the identification signals from the sensing interface, when the processing unit receives the triggering signal from the button, and when the processing unit determines that the power consumption amount is below the predetermined threshold over the predetermined time interval, wherein the processing unit further defines a plurality of time intervals according to the time points,
wherein the power consumption measurement and control unit further measures an interval power consumption amount flowing out the power output line within each of the time intervals and the processing unit performs the following operations for each of the time intervals:
(f) calculating an interval individual power consumption amount according to the interval power consumption amount and the user number of the time interval,
(g) retrieving at least one personal power consumption record from the power consumption recording table according to at least one identification code recorded in the user identification list, wherein the at least one personal power consumption record corresponds to the at least one identification code, and (h) adding the interval individual power consumption amount into the at least one personal power consumption record.

10. The power consumption measurement and control apparatus as claimed in claim 9, wherein in the operation (d), the sensing interface further writes a login state and the personal power consumption record corresponding to the identification code into a smart tag corresponding to the identification signal, wherein in the operation (e), the sensing interface further writes a logout state and the personal power consumption record corresponding to the identification code in the power consumption recording table into the smart tag, wherein the login state represents that a power consumption record in the smart tag corresponding to the identification code is lack of a latest power consumption amount and the logout state represents that the power consumption record in the smart tag corresponding to the identification code has been recorded.

11. A power consumption measurement and control method, being adapted for a power consumption measurement and control apparatus, the power consumption measurement and control apparatus comprising a storage unit, a processing unit, a power input line, a power output line, a sensing interface, and a power consumption measurement and control unit, the storage unit being stored with a user list and a power consumption recording table, a user number and a user identification list being recorded in the user list, the processing unit being electrically connected to the sensing interface and the power consumption measurement and control unit, the power consumption measurement and control unit comprising a logic switch connected to the power input line and the power output line, the power consumption measurement and control unit being further configured to measure a power consumption amount flowing out the power output line, the power consumption measurement and control method comprising the steps of:
(a) transmitting, by the processing unit, a first control signal to the power consumption measurement and control unit so that the logic switch is turned on in response to the first control signal when the logic switch is off and the processing unit receives a first identification signal from the sensing interface;
(b) transmitting, by the processing unit, a second control signal to the power consumption measurement and control unit so that the logic switch is turned off in response to the second control signal when the logic switch is on and one of the following conditions happens: (b1) the processing unit receives a second identification signal from the sensing interface and (b2) the processing unit determines that the power consumption amount is below a predetermined threshold over a predetermined time interval;
(c) receiving, by the processing unit, a plurality of identification signals from the sensing interface; and
(d) executing the following steps for each of the identification signals:
(d1) comparing an identification code carried by the identification signal with the user identification list after the processing unit receives each time one of the identification signals from the sensing interface;
(d2) writing the identification code into the user identification list and increasing the user number by one, when the identification code is not included in the user identification list; and
(d3) removing the identification code from the user identification list and decreasing the user number by one, when the identification code is included in the user identification list.

12. The power consumption measurement and control method as claimed in claim 11, wherein the power consumption measurement and control apparatus further comprises a button, the processing unit is electrically connected to the button, and the second control signal is transmitted to the power consumption measurement and control unit by the processing unit in the step (b) when the logic switch is on and the processing unit receives a triggering signal from the button so that the logic switch is turned off in response to the second control signal.

13. The power consumption measurement and control method as claimed in claim 12, further comprising the step of:
adding a first identification code carried by the first identification signal into the user identification list and increasing the user number by one after the step (a);
wherein the step (b) is performed when one of the following conditions happens: the processing unit receives the triggering signal from the button and the power consumption measurement and control unit determines that the power consumption amount flowing out the power output line is below the predetermined threshold over the predetermined time interval, wherein the power consumption measurement and control method further comprises the following step of:

deleting the content of the user identification list and setting the user number to zero after the step (b).

14. The power consumption measurement and control method as claimed in claim 11, further comprising the steps of:

adding a first identification code carried by the first identification signal into the user identification list and increasing the user number by one after the step (a);

wherein the step (b) is performed when the processing unit receives a second identification signal from the sensing interface, an identification code carried by the second identification signal has been recorded in the user identification list, and the user number is one, wherein the power consumption measurement and control method further comprises the following step of:

deleting the content of the user identification list and setting the user number to zero after the step (b).

15. The power consumption measurement and control method as claimed in claim 11, wherein the power input line is connected to a power source, and the power consumption measurement and control method further comprises the step of:

enabling the power consumption measurement and control unit to set a basic power value so that the power source supplies the basic power value to an electric appliance when the logic switch is turned off, wherein the basic power value is a power value that allows the electric appliance to perform one of a hot standby operation, a cooling operation, and a combination thereof.

16. The power consumption measurement and control method as claimed in claim 11, wherein the storage unit is further stored with a key, and the power consumption measurement and control method further comprises the steps of:

performing a verification procedure on a verification data carried by the first identification signal by using the key when the first identification signal is sensed by the sensing interface; and turning the logic switch on when the verification data passes the verification procedure.

17. The power consumption measurement and control method as claimed in claim 11, wherein the logic switch is on over a time interval, and the power consumption measurement and control method further comprises the step of:

recording, by the power consumption measurement and control unit, an interval power consumption amount flowing out the power output line within the time interval.

18. The power consumption measurement and control method as claimed in claim 11, wherein the logic switch is on over a plurality of time intervals, and the power consumption measurement and control method further comprises the steps of:

recording an interval power consumption amount flowing out the power output line within each of the time intervals; and cumulating the interval power consumption amounts into an accumulative power consumption amount.

19. The power consumption measurement and control method as claimed in claim 12, further comprising the steps of:

defining a time point individually when one of the following conditions happens: when each of the identification signals is received by the processing unit, when the triggering signal is received by the processing unit, and when the power consumption is determined below the predetermined threshold over the predetermined time interval by the processing unit;

defining the time intervals according to the time points;

measuring an interval power consumption amount flowing out the power output line within each of the time intervals; and executing the following steps for each of the time intervals:

calculating an interval individual power consumption amount according to the interval power consumption amount and the user number of the time interval;

retrieving at least one personal power consumption record from the power consumption recording table according to at least one identification code recorded in the user identification list, wherein the at least one personal power consumption record corresponds to the at least one identification code; and adding the interval individual power consumption amount into the at least one personal power consumption record.

20. The power consumption measurement and control method as claimed in claim 19, wherein the step (d2) further writes a login state into a smart tag corresponding to the identification signal when the identification code is not included in the user identification list, the step (d3) further writes a logout state into the smart tag corresponding to the identification signal and writes the personal power consumption record corresponding to the identification code in the power consumption recording table into the smart tag when the identification code is included in the user identification list, wherein the login state represents that a power consumption record in the smart tag corresponding to the identification code is lack of a latest power consumption amount and the logout state represents that the power consumption record in the smart tag corresponding to the identification code has been recorded.

21. A non-transitory computer readable storage medium, having a computer program stored therein, the computer program executing a power consumption measurement and control method when the computer program is loaded into a power consumption measurement and control apparatus, the power consumption measurement and control apparatus comprising a storage unit, a processing unit, a power input line, a power output line, a sensing interface, and a power consumption measurement and control unit, the storage unit being stored with a user list and a power consumption recording table, a user number and a user identification list being recorded in the user list, the processing unit being electrically connected to the sensing interface and the power consumption measurement and control unit, the power consumption measurement and control unit comprising a logic switch connected to the power input line and the power output line, the power consumption measurement and control unit being configured to measure a power consumption amount flowing out the power output line, and the power consumption measurement and control method comprising the steps of:

(a) transmitting, by the processing unit, a first control signal to the power consumption measurement and control unit so that the logic switch is turned on in response to the first control signal when the logic switch is off and the processing unit receives a first identification signal from the sensing interface;
(b) transmitting, by the processing unit, a second control signal to the power consumption measurement and control unit by the processing unit so that the logic switch is turned off in response to the second control signal when the logic switch is on and one of the following conditions happens: (b1) the processing unit receives a second identification signal from the sensing interface and (b2) the processing unit determines that the power consumption amount is below a predetermined threshold over a predetermined time interval;
(c) receiving, by the processing unit, a plurality of identification signals from the sensing interface; and
(d) executing the following steps for each of the identification signals:
  (d1) comparing an identification code carried by the identification signal with the user identification list after the processing unit receives each time one of the identification signals from the sensing interface;
  (d2) writing the identification code into the user identification list and increasing the user number by one, when the identification code is not included in the user identification list; and
  (d3) removing the identification code from the user identification list and decreasing the user number by one, when the identification code is included in the user identification list.

* * * * *